United States Patent [19]
Timmins

[11] Patent Number: 5,481,446
[45] Date of Patent: Jan. 2, 1996

[54] INDUCTOR CURRENT-SENSING CIRCUITRY

[75] Inventor: Graham J. A. Timmins, Hove, England

[73] Assignee: The BOC Group plc, Windlesham, United Kingdom

[21] Appl. No.: 953,033

[22] Filed: Sep. 29, 1992

[30] Foreign Application Priority Data

Oct. 3, 1991 [GB] United Kingdom ............... 9121014

[51] Int. Cl.$^6$ ............................................. H02M 1/12
[52] U.S. Cl. ................................. 363/41; 363/98
[58] Field of Search .................... 363/41, 97, 98, 363/132; 323/222, 282, 283, 284, 288, 290, 349, 351; 318/811; 388/811, 819, 907.2

[56] References Cited

U.S. PATENT DOCUMENTS

| 4,409,535 | 10/1983 | Hickman | 363/41 X |
|---|---|---|---|
| 4,458,194 | 7/1984 | Geppert et al. | 363/41 X |
| 4,520,437 | 5/1985 | Boettcher, Jr. et al. | 363/41 |
| 4,694,194 | 9/1987 | Hansel et al. | 363/41 X |
| 5,097,403 | 3/1992 | Smith | 363/127 |
| 5,204,594 | 4/1993 | Carobolante | 363/98 X |

*Primary Examiner*—Peter S. Wong
*Assistant Examiner*—Y. Jessica Han
*Attorney, Agent, or Firm*—David M. Rosenblum; Larry R. Cassett

[57] ABSTRACT

A pulse width modulated system for driving an inductive load. In the system, a switched current is supplied to the load. A duty cycle of the switched current is derived from a pulse width modulation controller and the amplitude of the switched current is determined. A multiplier device is provided to process the amplitude of the current supplied to a driver stage and to derive, in conjunction with the duty cycle, the load current.

2 Claims, 3 Drawing Sheets

INDUCTOR CURRENT-SENSING CIRCUITRY

BACKGROUND OF THE INVENTION

This invention relates to circuitry for driving an inductive load and the like and more particularly to such circuitry employing a pulse width modulation controller, especially for use in driving a motor or any other inductive load, especially when the load current is difficult to measure, for example a continuous current pulse width modulation power supply with isolated output.

Electric motors, for example a 3-phase brushed or brushless DC motor, can be driven by a pulse width modulation controller. In a pulse width modulated system, the switched current (of wave form of the type shown in FIG. 1) is often continuous, i.e. remains above zero, and the "fly-back" current (of wave form of the type shown in FIG. 2 and flowing during time $T_2$) is generally flowing in the load but not in the supply.

In such a system in particular, measurement of the load current is not straightforward and requires the continual measurement of the amount of current flowing in each phase; this is a complex procedure.

The present invention is based on the realisation that the need to measure the load current in each phase can be obviated and that this current can be measured from other more readily determined parameters of the system.

SUMMARY OF THE INVENTION

In accordance with the invention, there is provided a pulse width modulated system for driving an inductive load which comprises, means for supplying a switched current to the load, means for determining a duty cycle of the switched current from a pulse width modulation controller, means for determining the amplitude of the switched current, and a multiplier device. The multiplier device has means for processing the amplitude of the current supplied to a driver stage and for deriving, in conjunction with the duty cycle, the load current. Preferably the multiplier device is of the analogue type and may be incorporated in a feed back loop controlling the load current. The system is particularly suitable for driving a motor, for example a 3-phase DC motor.

In this specification, where the term "multiplier" is used, the synonymous term "divider" could equally well be used.

A typical waveform for the supply current is shown in FIG. 1 in which $I_1$ and $I_2$ are the nodal current values for each pulse and the base current value is at zero; $T_1$ and $T_2$ are the respective on and off times for each current cycle.

For such a load current, the average supply current $I_3$ can be expressed as:

$$I_3 = \frac{I_1 + I_2}{2} \times \frac{T_1}{T_1 + T_2} \quad (1)$$

and the duty cycle D can be expressed as:

$$D = \frac{T_1}{T_1 + T_2} \quad (2)$$

Combining equations (1) and (2)

$$I_3 = \frac{I_1 + I_2}{2} \times D \quad (3)$$

A typical waveform for the load current is shown in FIG. 2 in which $I_1$ and $I_2$, and $T_1$ and $T_2$, are the same values as shown in FIG. 1; the average load current, $I_4$ can be expressed as:

$$I_4 = \frac{I_1 + I_2}{2} \quad (4)$$

Combining equations (3) and (4), the average load current:

$$I_4 = \frac{I_3}{D}$$

It has therefore been found to be generally possible to ascertain the load current from a knowledge of the supply current and the duty cycle.

BRIEF DESCRIPTION OF THE DRAWINGS

For a better understanding of the invention, reference is now made, by way of exemplification only, to FIGS. 1 to 5 in which.

DETAILED DESCRIPTION

Figure 3:
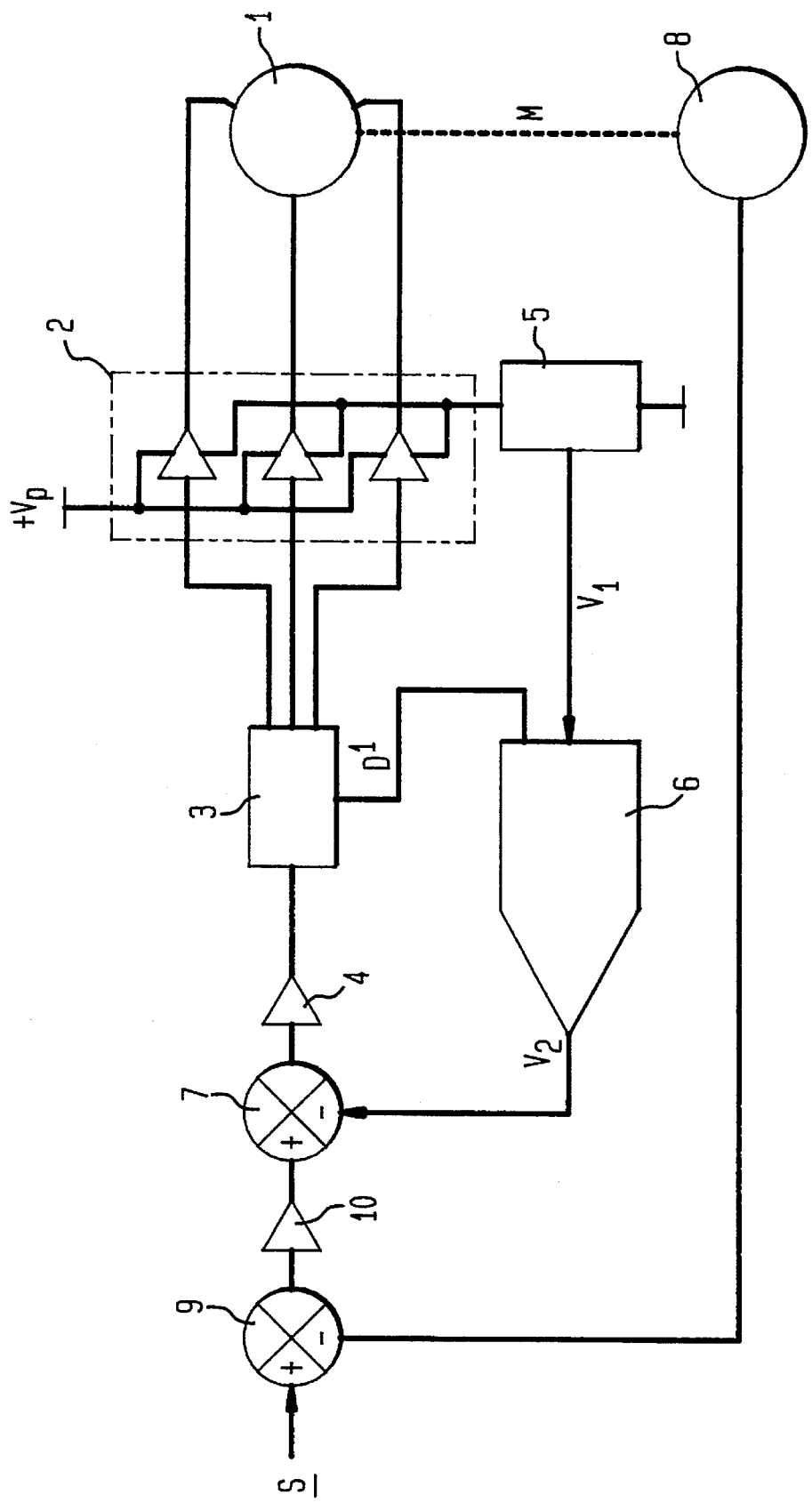
FIG. 3 shows a block diagram of a 3-phase DC motor controller including a speed control.

With reference to the drawings, and to FIG. 3 in particular, there is shown a block diagram for a controller for a 3-phase DC motor.

Figure 5:
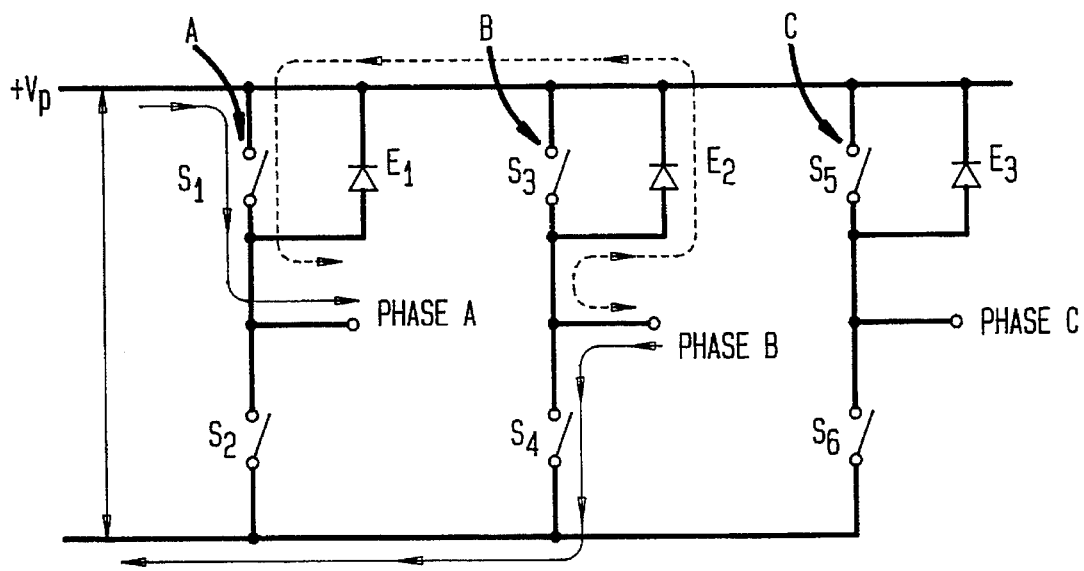
FIG. 5 shows the 3-phase DC motor driver stage for the system of FIG. 3.

It comprises a motor 1 of standard design driven by a driver stage 2 described more fully in FIG. 5. The driver stage 2 is controlled by a pulse width modulation controller 3 again of staridard design and function and taking the output from a current error amplifier 4.

Figure 4:
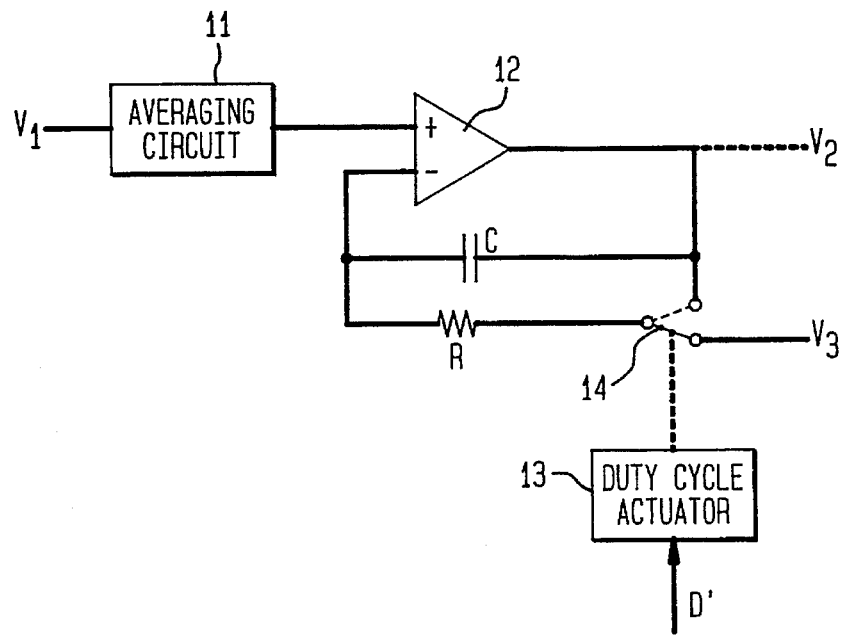
FIG. 4 shows the multiplier circuit of FIG. 3.

The supply current of the driver stage 2, sourced from a supply voltage (+$V_p$), can be measured by means of a current sensor 5 whose output is fed to a multiplier 6 described more fully in FIG. 4.

A current control loop is closed by connecting the output of the multiplier 6 to a current error summing junction 7 and the current error amplifier 4. An additional output from the pulse width modulation controller 3 provides a duty cycle signal via line "D" to the multiplier 6.

In addition, a speed control loop is closed by connecting the output of a speed sensor 8 coupled to the motor 1 (by a mechanical linkage M in this example) to a speed error summing junction 9 and the speed error amplifier 10. The speed error amplifier 10 produces the current demand signal for the current contro loop.

A speed input signal "S" (to produce a predetermined speed in the motor 1) is fed into the speed error summing junction 9.

The circuit shown in FIG. 3 has the general function of allowing the driver stage 2 (and the electrical power fed thereto via the supply voltage +$V_p$) to drive the motor 1 at a substantially constant operational speed and:

i) for the current control loop to control the acceleration of the motor up to its operational speed by means in particular, in accordance with the invention, the measurement of supply current to the motor driver stage by the current sensor 5 and the duty cycle signal, both of which are fed into the multiplier 6.

ii) for the speed control loop to control the motor once its normal operational speed has been attained.

With specific regard to the multiplier 6 shown in detail in FIG. 4; it comprises an averaging circuit 11 which averages the output $V_1$ from the current sensor 5 (see FIG. 3) of an operational amplifier 12 and a duty cycle actuator 13 which controls the operation of a switch 14.

The output $V_1$ of the current sensor 5 (see FIG. 3) is fed into a positive input of the operational amplifier 12 via the averaging circuit 11.

The actuator 13 causes movement of the switch 14 on the basis of the duty cycle D. The position of the switch 14 determines the voltage applied to a resistor R, i.e. either voltage $V_2$ (being the output voltage of the multiplier) or voltage $V_3$ (being a reference voltage), the mean of which, produced by the action of resistor R and capacitor C, is fed to the negative input of the operational amplifier 12. This mean voltage ($V_m$) is a function of the difference between $V_2$ and $V_3$ multiplied by the duty cycle D according to the equation:

$$Vm = V_3 + (V_2 - V_3)D$$

The capacitor C averages the voltage being fed to the negative input of the operational amplifier 12.

The motor driver stage is shown in more detail in FIG. 5; it comprises for each motor phase two switches (S) and a commutating element, for example a diode (E), namely
— $S_1$ and $S_2$ and $E_1$ respectively for phase A
— $S_3$ and $S_4$ and $E_2$ respectively for phase B
— $S_5$ and $S_6$ and $E_3$ respectively for phase C.

Figure 1:
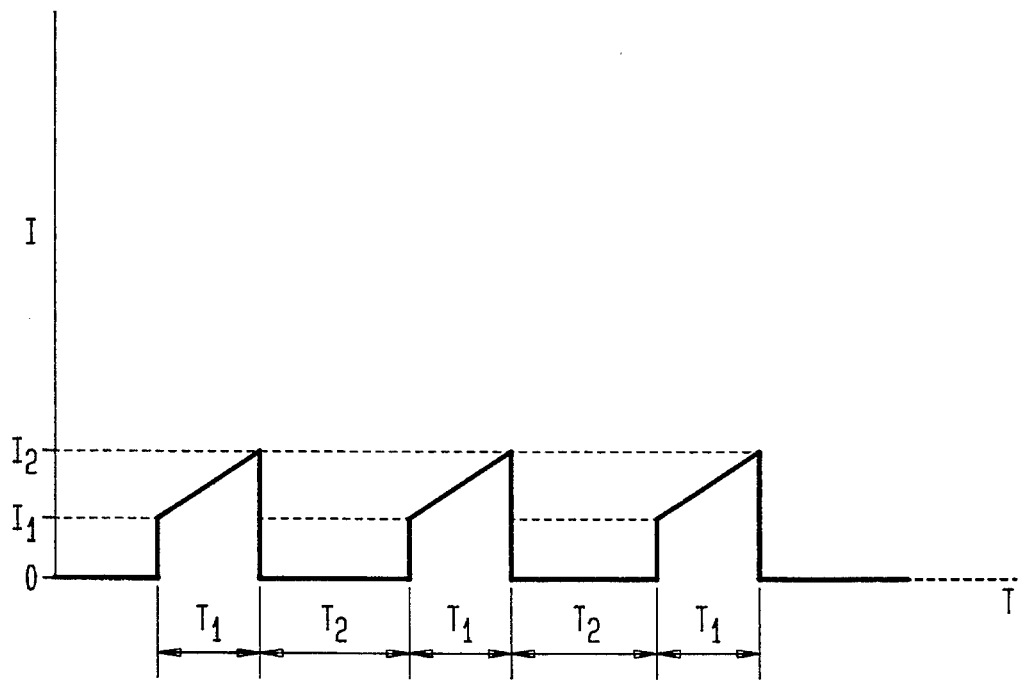
FIG. 1 shows a waveform for the supply current.
Figure 2:
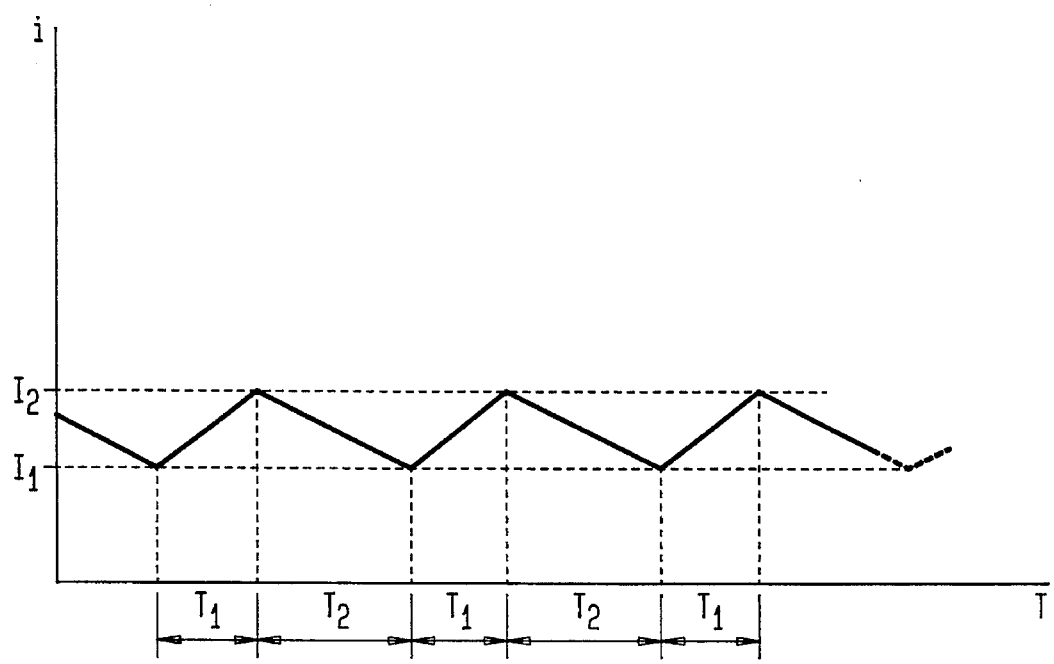
FIG. 2 shows a waveform for the load current.

On a "two quadrant" basis of operation with, for example, switch $S_1$ closed and switches $S_3$ and $S_5$ open, and with switches $S_2$ and $S_6$ also open, switch $S_4$ opens and closes in accordance with the pulse width modulation controller so that current flows in the supply during time $T_1$ (see FIG. 1) when switch $S_4$ is closed and the flyback current flows during time $T_2$ (see FIG. 2) when switch $S_4$ is open.

The mode of operation for phase A/phase B on the above basis with the solid lines indicating current flow when switch $S_4$ is closed and the dotted lines indicating flyback current flow when switch $S_4$ is open is shown in FIG. 5.

Similar modes of operation to that described above in respect of the opening/closing of switch $S_4$ for phase A/phase B will occur for phase B/phase C and for phase C/phase A in conjunction with the opening/closing cycles of switches $S_6$ and $S_2$ respectively. In the former case switch $S_3$ will be closed and switches $S_1$ and $S_5$ will be open, as will switches $S_2$ and $S_4$; in the latter case, switch $S_5$ will be closed and switches $S_1$ and $S_3$ will be open, as will switches $S_4$ and $S_6$.

Although the invention has been exemplified with reference to a three-phase motor, it may be applied to a motor having any number of phases or to any other inductive load. It can be applied to controllers with or without speed, position, current or any other form of feedback. It can be applied to any other inductive load, especially when the load current is difficult to measure, for example a continuous current pulse width modulation power supply with isolated output.

The general benefits of the invention are the avoidance of sensing the current in each phase and thereby being able to avoid the use, for example, of floating sense resistors, sense transformers and any such devices which would otherwise be needed for each phase of the motor.

It is therefore possible for controllers to be less costly and much smaller in size. They also are able to be more efficient in operation, especially in terms of power consumption.

I claim:

1. A pulse width modulated system for driving an inductive load which comprises:

means for supplying a switched current to the load;

a pulse width modulation controller controlling the switched current supply means and having means for determining a duty cycle of the switched current and for generating a duty cycle signal referable to said duty cycle;

means connected to said switched current supply means for determining the amplitude of the switched current and for generating a switched current signal referable to the amplitude of said switched current; and a multiplier device having means responsive to the switched current signal and the duty cycle signal for generating a load current signal referable to load current; and a current control loop having a current error summing junction junction responsive to said load current signal and a current demand signal for generating an error signal and a current error amplifier interposed between said pulse width modulation controller and said current error summing junction for introducing an amplified error signal to said pulse width modulation controller.

2. A pulse width modulation system according to claim 1 in which the inductive load is a motor.

* * * * *